United States Patent [19]

Ellis et al.

[11] Patent Number: 5,760,821
[45] Date of Patent: Jun. 2, 1998

[54] ELECTRONIC PROGRAM GUIDE SCHEDULE LOCALIZATION SYSTEM AND METHOD

[75] Inventors: Michael Dean Ellis, Boulder; Barry L. Smith, Englewood, both of Colo.; Constance J. Borges, Churchville, Pa.; Rose A. Reynolds, Boulder; Dennis Tenney, Louisville, both of Colo.

[73] Assignees: News America Publications, Inc., New York, N.Y.; Telecommunications of Colorado, Inc., Englewood, Colo.

[21] Appl. No.: 479,699

[22] Filed: Jun. 7, 1995

[51] Int. Cl.$^6$ .................................................. H04N 7/10
[52] U.S. Cl. ........................ 348/10; 348/906; 348/569; 348/8
[58] Field of Search .......................... 348/10, 8, 9, 1, 348/3, 960, 569, 906

[56] References Cited

U.S. PATENT DOCUMENTS

| | | | |
|---|---|---|---|
| 4,388,645 | 6/1983 | Cox et al. | 358/147 |
| 4,536,791 | 8/1985 | Campbell et al. | 358/122 |
| 4,691,351 | 9/1987 | Hayashi et al. | 380/10 |
| 4,695,880 | 9/1987 | Johnson et al. | 358/86 |
| 4,706,121 | 11/1987 | Young | 348/906 |
| 4,862,268 | 8/1989 | Campbell | 358/141 |
| 5,038,211 | 8/1991 | Hallenbeck | 358/142 |
| 5,223,924 | 6/1993 | Strubbe | 358/86 |
| 5,260,778 | 11/1993 | Kauffman et al. | 358/86 |
| 5,515,106 | 5/1996 | Chaney et al. | 348/906 |
| 5,550,576 | 8/1996 | Klosterman | 348/906 |
| 5,576,758 | 11/1996 | Davis et al. | 348/906 |

FOREIGN PATENT DOCUMENTS

| | | | |
|---|---|---|---|
| 55-141876 | 11/1980 | Japan | H04N 7/16 |
| 2118750 | 11/1983 | United Kingdom | |

OTHER PUBLICATIONS

"Videotext Brings Teletext Under Admissible Control", C-ED, Aug. 1979, pp. 18–23.

Primary Examiner—Victor R. Kostak
Attorney, Agent, or Firm—Weil, Gotshal & Manges, LLP

[57] ABSTRACT

A system and method for localizing an aggregated electronic program guide (EPG) schedule covering a plurality of service environments includes an information filter located at the subscriber's set-top box conditioned to recognize which schedule information is relevant to the viewer's service environment. Only schedule information corresponding to the viewer's own service environment is stored in the EPG's schedule database. The result is an electronic program schedule that is tailored to the viewer's specific service environment without the use of costly equipment on the transmission side of the program schedule feed.

18 Claims, 2 Drawing Sheets

ELECTRONIC PROGRAM GUIDE SCHEDULE LOCALIZATION SYSTEM AND METHOD

FIELD OF INVENTION

The present invention relates to a television program guide ("EPG"), and, in particular, to a system and method for "localizing" a national EPG schedule to filter out schedule information not relevant to a viewer's service environment.

BACKGROUND OF INVENTION

There are known EPG systems which provide television viewers with on-screen program schedule information in a convenient format. In so-called interactive EPGs, the operation of the EPG is under user control so that the user may browse schedule information in any order, select programs from on-screen menus for current or future viewing, order pay-per-view programming and perform other useful operations on demand. An example of an advanced EPG system is described in co-pending application Ser. No. 08/119367 by Bennington, et al., entitled "Electronic Television Program Guide Schedule System and Method"(hereinafter, "Bennington et al."), incorporated herein by reference.

Most EPGs operate in the following basic manner: program schedule information, and sometimes applications and/or systems software, is transmitted to equipment located on the viewer's premises (usually a "set-top box") by way of broadcast, cable, direct satellite or some other suitable form of transmission. The set-top box contains memory so that the program schedule information can be retained for later viewing. The program schedule information stored in the set-top box is periodically updated (e.g., on a continuous, daily, weekly, bi-weekly basis). A programmed microcontroller in the set-top box cooperates with the viewer's television set to display the stored program schedule information and to implement other functions of the EPG in response to user-generated signals. The functions available will depend on the sophistication of the particular EPG.

Currently, the television programming available to a viewer depends on the service provider servicing the viewer's region. For example, in the U.S., cable operators are usually given a franchise from the local government to provide cable service to a particular locale. This means that, in general, program schedules will vary according to region.

It would be advantageous to publishers of program guides on a national scale, e.g., TV GUIDE, to be able to transmit a single, national program schedule to all participating service providers in diverse geographic regions. In this way, the EPG publisher would avoid the cost and complexity of having to route schedule information according to destination, which would require multiple, geographically targeted transmissions. At the same time, it would also be desirable to "localize" the national feed, tailoring the schedule to each locale, without adding to the cost and complexity of the service provider's transmission equipment.

BRIEF SUMMARY OF INVENTION

These and other objects are accomplished in accordance with the present invention by an EPG program schedule localization system and method in which a national program schedule feed is "localized" by a schedule information filter implemented in each viewer's set-top box. The localization filter automatically recognizes which schedule information is relevant to the viewer's service environment and stores or rejects the information accordingly. The result is an electronic program schedule that is tailored to the viewer's specific service environment without the use of costly equipment on the transmission side of the program schedule feed. And, because only one copy of the program schedule data is required to serve multiple locales, the total amount of data to be sent is minimized, further reducing costs. The single program feed of the present invention has the further advantage of decreasing transmission time, which means that schedule data reaches subscribers more quickly. In other embodiments of the invention, some of the localization filtering is performed at the subscriber's headend, thus freeing up transmission bandwidth on the medium connecting the subscriber's set-top box with the headend.

DETAILED DESCRIPTION OF A PREFERRED EMBODIMENT

The system and method of the present invention may be implemented on any suitable EPG platform having storage means for storing program schedule information, programmed processor means for executing a memory management software program in accordance with the invention's various memory management functions, and a clock for keeping track of the current date and time. The program of the present invention may be stored in a separate storage means or in a separate portion of the same storage means used for the schedule information. The coding of a program to carry out the information filtering procedures of the present invention will be readily apparent to the ordinarily-skilled programmer.

Figure 1:
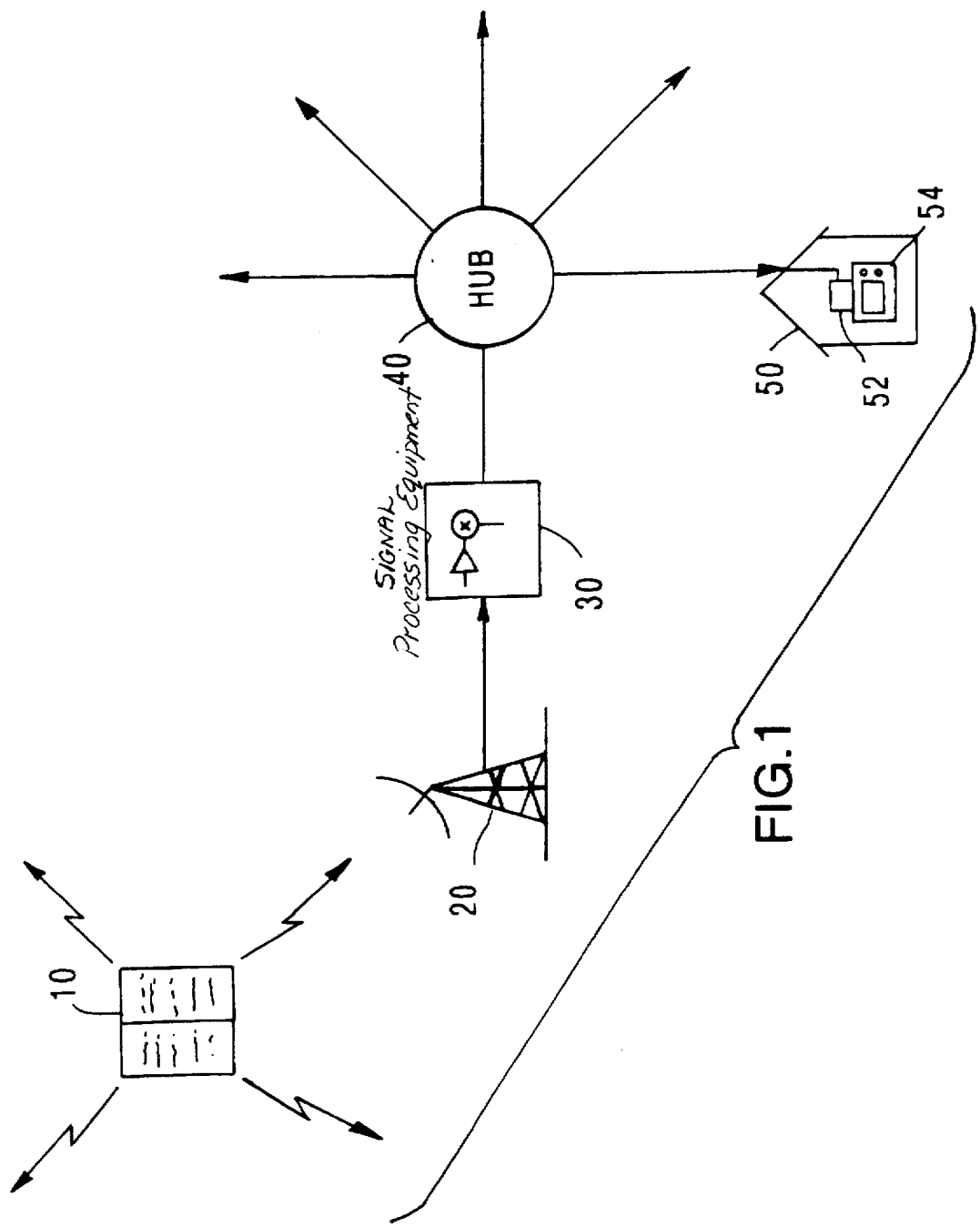
FIG. 1 is an overview of an illustrative embodiment of the present invention.

A suitable platform for implementing the present invention is the EPG of Bennington, et al., mentioned above. Referring to FIG. 1 of Bennington, et al., the program of the present invention is loaded into and stored in non-volatile memory EEPROM 20. Schedule information in this platform is stored in a database constructed in DRAM 18. As explained in Bennington, et al., no special transmission protocols are required to send and receive program schedule information. The construction and organization of the program schedule database are routine tasks, as the ordinarily-skilled artisan will appreciate.

Microcontroller 16 provides a suitable processor means for executing the program of the present invention, and the clock 19 keeps track of the current time and date (for comparing against schedule records). Other suitable hardware configurations will occur to those skilled in the art to which the present invention pertains. The present invention is not directed to the particular details of the display means of the EPG, and, to avoid obscuring the present invention, the operation of such elements will not be discussed here.

FIG. 1 presents an overview of the invention, using a cable system and national schedule feed as examples. The present invention may, however, be used with any mode of transmission (e.g., direct broadcast satellite), as will be readily apparent. The present invention is not directed to the particular mode of transmitting the program schedule feed, nor is it limited to any particular feed scope. Referring to FIG. 1, a national electronic program schedule feed 10 is transmitted by suitable means (e.g., satellite) to a viewer's cable "headend" antennae 20, which drives the local CATV distribution network. This same national feed 10 is sent to all service providers with whom the EPG publisher has made appropriate arrangements for reception and distribution of the schedule. The geography served by the EPG schedule publisher is limited only by the reach of the service providers accepting the national feed. In some preferred embodiments of the present invention, a complete new schedule is sent to subscribers on a daily, weekly, or some other periodic basis. In other preferred embodiments, the system does not wait until a complete new schedule is ready to be transmitted before updating the EPG. Rather, incremental updates to the program schedule are continuously sent to subscribers. In this "cyclical" mode of operation, when all of the data in a schedule has been sent, transmission of schedule data updates immediately begins. Each subsequent transmission includes updates to schedule information already stored in the EPG as well as new data for the end of the covered time period. Any schedule data that has expired since the last transmission is not sent.

Signal processing equipment 30 located at the headend conditions the received signals for distribution to end users via the distribution hub 40. Note at this point that no filtering of the electronic program schedule has been performed, and that no special equipment at the headend has been introduced. Hub 40 next distributes the national program schedule 10 to each subscriber 50 serviced by that hub. The schedule 10 is received by the set-top box 52 located on the viewer's premises, where the schedule is localized according to the present invention for display on the viewer's television receiver 54.

Figure 2:
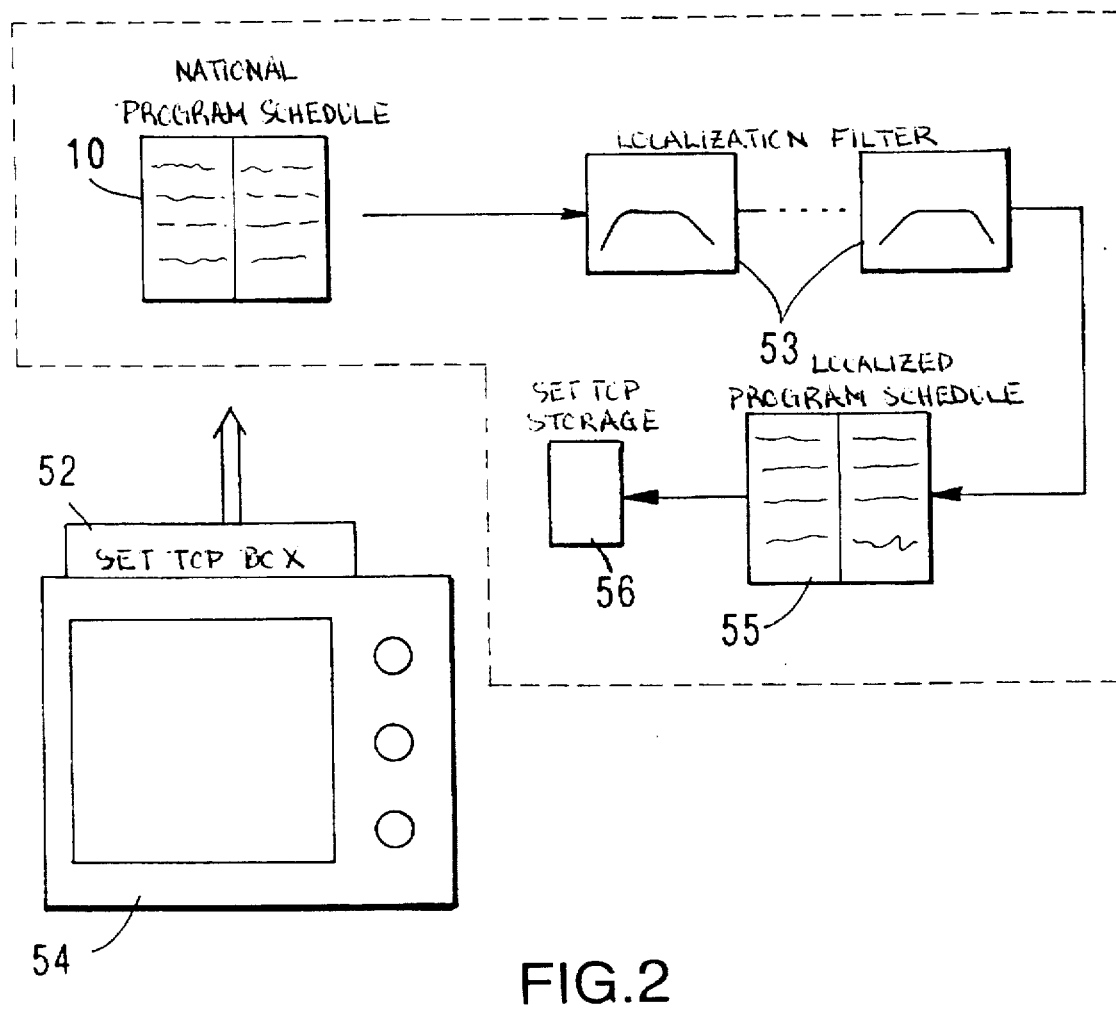
FIG. 2 shows the localization information filter of the present invention.

Referring now to FIG. 2, the information localization filter 53 of the present invention is implemented in the set top box 52 as follows. The overall object is to transform the national program schedule 10 into a localized version 55 which is then stored in the set-top box storage means 56 (designated DRAM 16 in FIG. 1 of Bennington, et al.). In this illustrative embodiment, the localization filter 53 is implemented in the EPG software program running on the set-top box. The filter may, however, be implemented in dedicated hardware filters configured to execute the procedures described below. Those skilled in the art will readily understand how to construct a hard-wired version of the filtering system and method herein described. A combination of hardware and software filters may also be used.

Each set-top box 52 is assigned to a number of "groups." In the preferred embodiment, set-top groups would include groups corresponding to the viewer's:

cable operator (e.g., TCI)
geographic region (e.g., Colorado)
particular cable system (e.g. Mile Hi Cablevision)
cable headend (e.g., Denver headend)
subscribers paying for a particular rate for service (e.g., within the City of Denver cable franchise)
EPG software version (deluxe application, etc.)

The groups are numbered (e.g., EPG software version=2, geographic region=3, cable operator=4, cable system=5, cable headend=6, subscriber group=7, etc.) for easy identification and for other reasons explained later. Hereinafter, the term "scope" will be used to refer to a collection of groups of the same type, e.g., all cable operators, whereas "group" will be used to refer to specific members within the corresponding scope. In addition, each group is assigned a range of numbers for purposes of identifying specific members of the corresponding scope (e.g., 1–200 for cable operators, 201–500 for geographical region, etc.).

Prior to receiving schedule information for the first time, each set-top box 52 is sent a set of group numbers corresponding to all of the specific groups of which it is a member. The group numbers may be sent to the set-top box via any of the methods discussed in Bennington, et al. This set of group numbers provides the filtering criteria by which schedule information on the national feed is localized. This is made possible by addressing all of the program schedule data in the national feed 10 by group number and comparing the data's group addresses with the set of group numbers stored in the viewer's set-top box 52. If the data is addressed to a group number that is not found in the set-top box, that data is rejected by the localization filter 53. If, on the other hand, a match between the program data address and a group number in the set-top box is found, then the data corresponds to programming available in the viewer's service area and is accordingly stored in the program schedule database 56. Data intended for all subscribers nationwide is addressed without a group number. The information filter 53 is configured to pass all such data addressed without a group number. Only the schedule information corresponding to the viewer's own service area is passed on to the EPG memory by the information filter 53, thereby "localizing" the national feed 10. At the same time, the present invention conserves system memory by rejecting extraneous program schedule information not relevant to the viewer's service environment.

By way of example, a data item corresponding to a program available nationwide, such as the program's description, would be addressed without a group number to ensure that such data is loaded into the schedule database 56. By contrast, data corresponding to programming available only locally would be addressed to the unique group number associated with the locale(s) in which the program is available. In a like manner, all of the data in the national feed is addressed by attaching a group number corresponding to the desired destination.

In another aspect of the present invention, each data item filtered in the localization filter 53 prior to storage in the EPG's memory 56 is tagged with the scope number on which it has been filtered. Higher scope numbers are assigned to more narrowly targeted data (e.g., cable headend=6 versus geographic region=3), as shown in the example above. A higher scope number reflects the greater utility of data with a more local (narrow) orientation. The specific scope numbers used here are merely exemplary, and are not critical to the operation of the invention. Tagging filtered data with its corresponding scope number is useful in cases where the same data item is sent multiple times with group numbers falling within more than one scope. This situation might arise where the price data for a pay-per-view program varies depending on the cable system (scope=5) within the cable operator's (scope =4) service area. In that situation, the price corresponding to the more narrowly scoped version of the data would be more useful than the more widely scoped version. Accordingly, if the set-top box software running the EPG program receives multiple copies of the price data, only the most narrowly scoped version, i.e., the one of most interest, of the data is retained. Where the most narrowly scoped version is already loaded in the program database 56, differently scoped versions of the data are discarded by the filter 53 as soon as they are received. If a more widely scoped version of a particular data item is received first, it is saved until a more narrowly scoped version is received, at which point the widely scoped version is replaced with the version having a more narrow scope.

In another embodiment of the present invention, some of the filtering performed at the set-top box is performed at the headend. Referring again to FIG. 1, the signal processing means 30 located at the headend is provisioned with an information filter that is configured in the same way as the set-top boxes connected to the headend, except that no filtering is performed for data scoped more narrowly than headend. This arrangement eliminates data which is not needed by any set-top box connected to that headend, freeing up transmission bandwidth in the path connecting the headend and the associated set-top boxes. The headend could use this bandwidth to increase the frequency at which program schedule data is sent to subscribers, in a sense "concentrating" the data transmitted on the national feed 10. This in turn would facilitate the use of slower data rates to transmit the national feed 10 to the headend, reducing costs.

As should be apparent from the above description, the present invention provides a flexible and cost effective means for localizing a national program schedule feed. By distributing the filtering intelligence to the edges of the schedule distribution network, the present invention eliminates the costs and complexities associated with multiple, individually-targeted transmissions and reduces the bandwidth necessary to transmit schedule information at a given rate.

It will be appreciated that although the present invention has been described by reference to particular embodiments, many other embodiments may be implemented without departing from the spirit and scope of the invention as set forth in the following claims.

We claim:

1. In a television electronic program guide (EPG) system, including means for receiving program schedule information, means for storing the program schedule information, means for executing an EPG program and display means for displaying schedule information on-screen, a program schedule localization system comprising:

a) means for receiving aggregated program schedule information for a plurality of service environments;
   b) means for identifying the program schedule information corresponding to a viewer's service environment;
   c) means for discarding program schedule information corresponding to service environments outside the viewer's; and
   d) means for storing the program schedule information not discarded.

2. The schedule localization system according to claim 1 wherein a viewer's service environment is identified by a set of service groups to which the viewer is assigned, each service group identifying the service environment with a different level of specificity.

3. The schedule localization system according to claim 2 wherein schedule data in the aggregated program schedule intended for a selected service environment includes address data representing the service group to which such schedule data pertains.

4. The schedule localization system according to claim 3 wherein the means for identifying the program schedule information corresponding to a viewer's service environment includes means for storing data representing each of the service groups to which the viewer is assigned and means for comparing the address data in the aggregated program schedule with the stored service group data.

5. The schedule localization system according to claim 4 wherein schedule information in the aggregated program schedule intended for a selected service environment is stored if a match is found between the address data associated with such schedule information and the stored service group data representing at least one service group in the set of service groups to which the viewer is assigned.

6. The schedule localization system according to claim 5 further comprising means for providing an indication of the level of service environment specificity of each service group stored in the means for storing service group data and means for tagging stored schedule information with the indication corresponding to the service group on which a match with the address data of such schedule information was found.

7. The schedule localization system according to claim 6 further comprising means for replacing stored schedule information with a new version of such schedule information if the service environment specificity indication associated with such new version is more specific to the viewer's service environment than the service environment specificity indication associated with the already stored schedule information.

8. The schedule localization system according to claim 7 further comprising means for rejecting a new version of schedule information already stored if the service environment specificity indication associated with such new version is less specific to the viewer's service environment than the service environment specificity indication associated with the already stored schedule information.

9. The schedule localization system according to claim 2 wherein the service groups include geographic region and service provider.

10. In a television electronic program guide (EPG) system, including means for receiving program schedule information, means for storing the program schedule information, means for executing an EPG program and display means for displaying schedule information on-screen, a program schedule localization method comprising the steps of:

a) receiving aggregated program schedule information for a plurality of service environments;
   b) identifying the program schedule information corresponding to a viewer's service environment;
   c) discarding program schedule information corresponding to service environments outside the viewer's; and
   d) storing the program schedule information not discarded.

11. The schedule localization method according to claim 10 wherein a viewer's service environment is described by a set of service groups, each service group identifying the service environment with a different level of specificity.

12. The schedule localization method according to claim 11 wherein schedule data in the aggregated program schedule intended for a selected service environment includes address data representing the service group to which such schedule data pertains.

13. The schedule localization method according to claim 12 wherein the step of identifying the program schedule information corresponding to a viewer's service environment includes the step of storing data representing each of the viewer's service groups and the step of comparing the address data in the aggregated program schedule with the stored service group data.

14. The schedule localization method according to claim 13 wherein schedule information in the aggregated program schedule intended for a selected service environment is stored if a match is found between the address data associated with such schedule information and the stored service group data representing at least one service group in the set of service groups to which the viewer is assigned.

15. The schedule localization method according to claim 14 further comprising the step of providing an indication of the level of service environment specificity of each service group stored in the means for storing service group data and the step of tagging stored schedule information with the indication corresponding to the service group on which a match with the address data of such schedule information was found.

16. The schedule localization method according to claim 15 further comprising the step of replacing stored schedule information with a new version of such schedule information if the service environment specificity indication associated with such new version is more specific to the viewer's service environment than the service environment specificity indication associated with the already stored schedule information.

17. The schedule localization method according to claim 16 further comprising the step of rejecting a new version of schedule information already stored if the service environment specificity indication associated with such new version is less specific to the viewer's service environment than the service environment specificity indication associated with the already stored schedule information.

18. The schedule localization method according to claim 11 wherein the service groups include geographic region and service provider.

\* \* \* \* \*